J. Harsha.
Plow & Harrow.
N° 73002 — Patented Jan. 7, 1868.
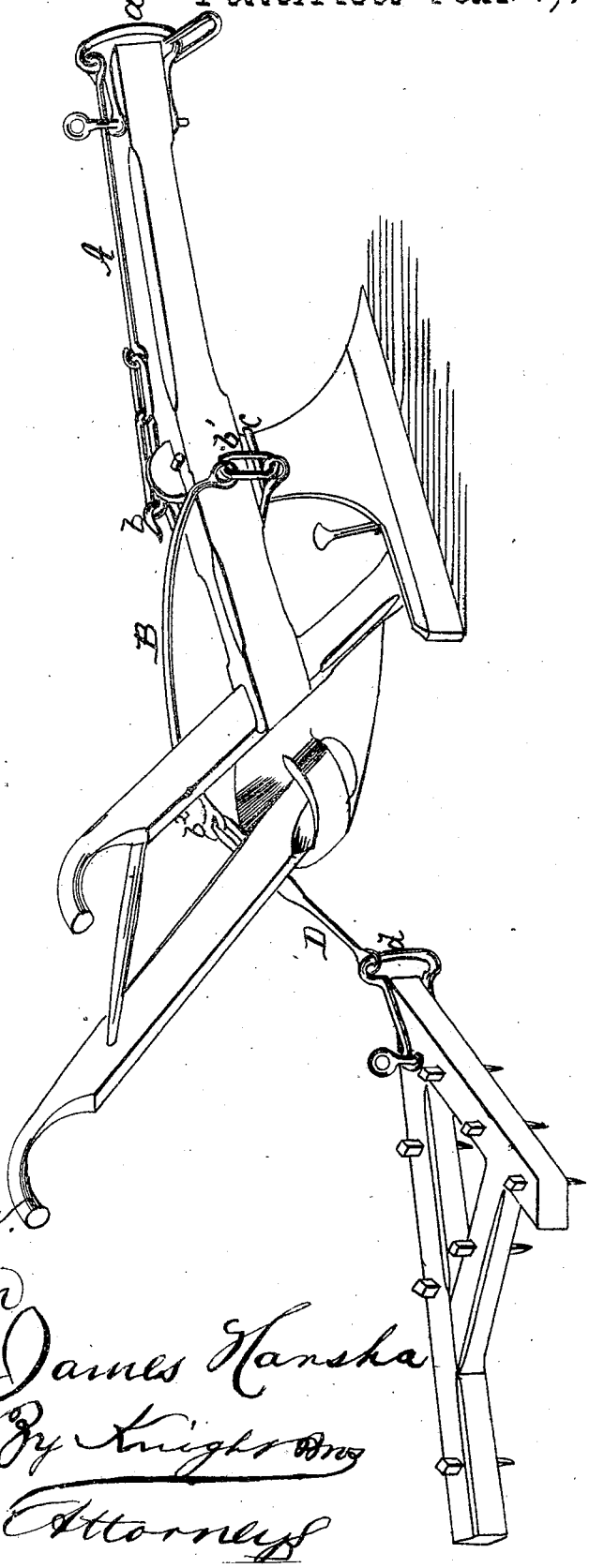
Witnesses:
J.E.W. Bowen
James Chinn
James Harsha
By Knight
Attorneys

United States Patent Office.

JAMES HARSHA, OF CIRCLEVILLE, OHIO.

Letters Patent No. 73,002, dated January 7, 1868.

IMPROVEMENT IN PLOUGH AND HARROW COMBINED.

*The Schedule referred to in these Letters Patent and making part of the same.*

TO ALL WHOM IT MAY CONCERN:

Be it known that I, JAMES HARSHA, of Circleville, in the county of Pickaway, and State of Ohio, have invented a new and useful Combined Plough and Harrow; and I do hereby declare the following to be a full, clear, and exact description of the same, reference being had to the accompanying drawing, which is made a part of this specification.

My invention consists in so connecting an ordinary plough and harrow, that, while the harrow is drawn out of the way of the ploughman, the draught will be nearly in a line with the plough-beam, so as not to impair the steadiness of the plough.

In the drawings, a plough and harrow combined by my improved mode are represented by a perspective view.

A is a bar or chain attached to the clevis $a$ of the plough, or to the hook of the whiffle-tree, and extending back a suitable distance; also attached to the hook $b$ on the bar or lever B. This lever B is attached to the standard of the plough by means of the link $b^1$, and loop or strap C, or their equivalents, or by some other suitable device to the plough-beam, and, projecting out a sufficient distance past the mould-board, is provided with an eye, $b^2$, on its outer end, to which the chain D is attached, this chain being attached at its lower end to the clevis $d$ of the harrow. The harrow may be placed on the plough for transportation to and from the field.

My invention is applicable to any of the ploughs and harrows now in use, and may be applied to any of them by a slight change in the manner of attaching the lever B.

Its object is to so combine these two implements that a single laborer, with a single team, may perform the double operation of ploughing and harrowing in the same time usually employed in doing one of them, without any additional labor or inconvenience.

Having thus described my invention, what I claim as new, and desire to secure by Letters Patent, is—

The bar or chain A, lever B $b$, and chain D, arranged and applied, substantially as described, for the purpose of combining an ordinary plough and harrow.

To the above specification of my new and useful plough and harrow combined, I have signed my hand, this 15th day of July, 1867.

JAMES HARSHA.

Witnesses:
  C. S. BITZER,
  C. J. CURNE.